United States Patent
Kang

(10) Patent No.: US 9,958,967 B2
(45) Date of Patent: May 1, 2018

(54) METHOD AND ELECTRONIC DEVICE FOR OPERATING ELECTRONIC PEN

(71) Applicant: Samsung Electronics Co., Ltd., Suwon-si (KR)

(72) Inventor: Tae Kyoung Kang, Gumi-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 14/882,269

(22) Filed: Oct. 13, 2015

(65) Prior Publication Data
US 2016/0103504 A1    Apr. 14, 2016

(30) Foreign Application Priority Data
Oct. 13, 2014 (KR) .................. 10-2014-0137719

(51) Int. Cl.
G06F 3/038 (2013.01)
G06F 3/041 (2006.01)
G06F 3/0488 (2013.01)
G06F 3/0354 (2013.01)

(52) U.S. Cl.
CPC .......... *G06F 3/038* (2013.01); *G06F 3/03545* (2013.01); *G06F 3/0416* (2013.01); *G06F 3/0488* (2013.01); *G06F 3/04883* (2013.01); *G06F 2203/04106* (2013.01); *G06F 2203/04808* (2013.01)

(58) Field of Classification Search
CPC .... G06F 3/038; G06F 3/03545; G06F 3/0416; G06F 3/0488; G06F 3/04883
See application file for complete search history.

(56) References Cited

U.S. PATENT DOCUMENTS

| | | | |
|---|---|---|---|
| 648,723 A | 5/1900 | Brown | |
| 2010/0079373 A1* | 4/2010 | Ohnishi | G06F 3/03545 345/157 |
| 2011/0227881 A1 | 9/2011 | Misawa et al. | |
| 2011/0310031 A1* | 12/2011 | Harris | G06F 1/1616 345/173 |
| 2012/0262407 A1 | 10/2012 | Hinckley et al. | |
| 2013/0104054 A1* | 4/2013 | Cao | G06F 3/038 715/753 |
| 2013/0125068 A1* | 5/2013 | Harris | G06F 3/04883 715/863 |
| 2013/0286033 A1* | 10/2013 | Mesaros | G06F 3/03545 345/589 |
| 2013/0335333 A1* | 12/2013 | Kukulski | G06F 3/04845 345/173 |

(Continued)

FOREIGN PATENT DOCUMENTS

KR    20130092934    8/2013

*Primary Examiner* — Kevin M Nguyen

(57) ABSTRACT

A electronic device includes a display for outputting an input area related to operation of an electronic pen in response to occurrence of a specified event related to the electronic pen, and a processor configured to process a function related to the operation of the electronic pen corresponding to a specific event that occurs on the basis of the input area. An electronic device includes a display comprising an input area for receiving an event for configuring an execution attribute of an electronic pen, and a processor configured to change the execution attribute of the electronic pen if the event is detected through the input area.

18 Claims, 10 Drawing Sheets

(56) References Cited

U.S. PATENT DOCUMENTS

| | | | |
|---|---|---|---|
| 2014/0035843 A1* | 2/2014 | Zo | G06F 3/03542 345/173 |
| 2014/0049521 A1 | 2/2014 | Gil et al. | |
| 2014/0082538 A1* | 3/2014 | Hibi | G06F 3/04845 715/769 |
| 2014/0191983 A1* | 7/2014 | Choi | G06F 3/0412 345/173 |
| 2014/0340318 A1* | 11/2014 | Stringer | G06F 3/03545 345/173 |
| 2015/0058795 A1* | 2/2015 | Koarai | G06F 3/04847 715/799 |
| 2015/0109263 A1 | 4/2015 | Hargreaves et al. | |

* cited by examiner

METHOD AND ELECTRONIC DEVICE FOR OPERATING ELECTRONIC PEN

The present application is related to and claims the benefit under 35 U.S.C. § 119(a) of a Korean patent application filed on Oct. 13, 2014 in the Korean Intellectual Property Office and assigned Serial number 10-2014-0137719, the entire disclosure of which is hereby incorporated by reference.

TECHNICAL FIELD

The present disclosure relates to operation of an electronic pen.

BACKGROUND

Electronic devices such as smartphones and tablets provide useful functions to users through various applications. Such electronic devices include input devices such as a button or the like. Furthermore, such electronic devices support an electronic pen function.

In relation to the electronic pen function, a typical electronic device is provided with a touch panel so as to recognize contact of an electronic pen. The electronic pen enables a user to input information more precisely than using a finger. The electronic pen function may allow selection of various pen types. For example, a typical electronic pen function may allow change of pen attributes such as a thickness or color.

However, for changing the pen attributes, the typical electronic pen function requires a user to make selections through a step of selecting a menu, a step of selecting a pen attribute from the menu, and a step of selecting an attribute type. Accordingly, the user should repeatedly perform the steps when a specific input operation (e.g., drawing) requires frequent changes in the pen attributes, so that the user may feel inconvenience.

SUMMARY

To address the above-discussed deficiencies, it is a primary object to provide an electronic pen operating method for facilitating operation of an electronic pen and an electronic device supporting the same.

In accordance with an aspect of the present disclosure, an electronic device includes a display for outputting an input area related to operation of an electronic pen, and a processor (ex: pen function processing module) configured to process a function related to the operation of the electronic pen corresponding to a specific event input to the input area.

In accordance with another aspect of the present disclosure, a method for operating an electronic pen includes outputting an input area related to operation of the electronic pen in response to occurrence of a specified event, receiving a specific event through the input area, and processing a function related to the operation of the electronic pen corresponding to the specific event.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
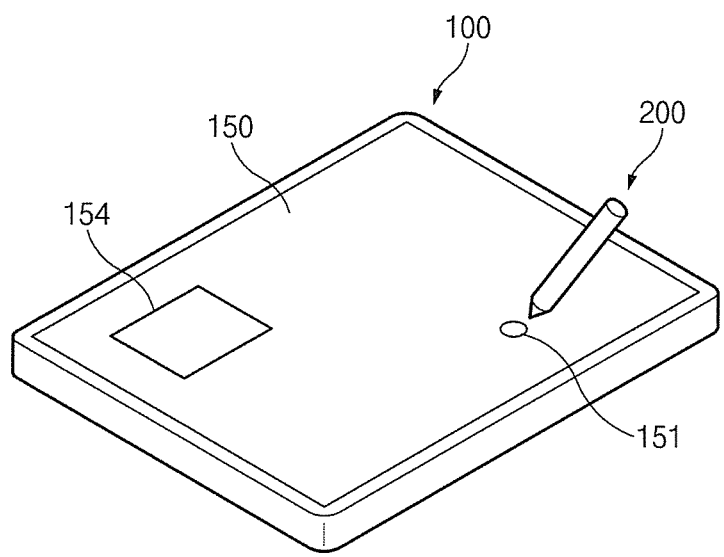
FIG. 1 illustrates an electronic pen operating environment according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described in detail with reference to the accompanying drawings. However, it should be understood that the present disclosure is not limited to specific embodiments, but rather includes various modifications, equivalents and/or alternatives of the embodiments of the present disclosure.

Regarding description of the drawings, like reference numerals may refer to like elements.

The term "have", "may have", "include", "may include" or "comprise" used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of order and/or priority, but does not limit the elements. Such terms may be used to distinguish one element from another element. For example, "a first user device" and "a second user device" may indicate different user devices regardless of order or priority. For example, without departing the scope of rights of various embodiments of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one item of software or program stored in a memory device to perform a corresponding operation.

The terminology used herein is not for delimiting the present disclosure but for describing specific various embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a personal digital assistant (PDA), a portable multimedia player (PMP), a Motion Picture Experts Group (MPEG-1 or MPEG-2) Audio Layer 3 (MP3) player, a mobile medical device, a camera, or a wearable device (e.g., smartglasses, a head-mounted device (HMD), an electronic apparel, an electronic bracelet, an electronic necklace, an electronic appccessory, an electronic tattoo, a smart mirror, or a smartwatch).

In some embodiments, the electronic device may be a smart home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox®, PlayStation®), an electronic dictionary, an electronic key, a camcorder, or an electronic picture frame.

In another embodiment of the present disclosure, the electronic device may include at least one of various medical devices (e.g., various portable medical measurement devices (a blood glucose measuring device, a heart rate measuring device, a blood pressure measuring device, or a body temperature measuring device), magnetic resonance angiography (MRA), magnetic resonance imaging (MRI), computed tomography (CT), a scanner, or an ultrasonic device), a navigation device, a global positioning system (GPS) receiver, an event data recorder (EDR), a flight data recorder (FDR), a vehicle infotainment device, electronic equipment for vessels (e.g., a navigation system or a gyrocompass), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, or a boiler).

According to various embodiments of the present disclosure, the electronic device may include at least one of a part of furniture or a building/structure, an electronic board, an electronic signature receiving device, a projector, or a measuring instrument (e.g., a water meter, an electricity meter, a gas meter, or a wave meter). In various embodiments of the present disclosure, the electronic device may be one or more combinations of the above-mentioned devices. In various embodiments of the present disclosure, the electronic device may be a flexible device. The electronic device according to various embodiments of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an electronic pen operating environment according to various embodiments of the present disclosure.

Referring to FIG. 1, according to an embodiment of the present disclosure, the electronic pen operating environment may include an electronic device 100 and an electronic pen 200.

The electronic pen 200 may include a pen body and a pen tip. The pen body may be gripped by a user. The pen tip may be used to touch one point of a display 150 included in the electronic device 100. The pen tip may electrically interact with a touch panel included in the display 150. In relation to this operation, the pen tip may include at least one of a structure (including a coil reactive to an electromagnetic induction touch panel) or a material recognizable by the touch panel (e.g., a rubber material reactive to a capacitor). In the case where the touch panel recognizes a touch event on the basis of a pressure type, the pen tip may be formed of various materials (e.g., a metallic material or a nonmetallic material such as wood, plastic, or rubber) without being limited to a specific material. The electronic pen 200 may be detachably attached to a specific portion of the electronic device 100. Alternatively, the electronic pen 200 may be provided separately from the electronic device 100. According to various embodiments of the present disclosure, the electronic pen 200 may include at least one button. The at least one button may change a physical characteristic of the electronic pen 200. In the case where the electronic pen 200 includes a button, the electronic device 100 may differentiate, corresponding to a setting, a button input of the electronic pen 200 which occurs while the button is pressed from a pen touch event which occurs while the button is not pressed, so as to recognize the inputs as different inputs.

The electronic device 100 may support operation of the electronic pen 200 on the basis of the display 150 including at least one touch panel. For example, the electronic device 100 may include a touch panel capable of recognizing contact or approach (approach within a specified distance) of the pen tip of the electronic pen 200. If the electronic pen 200 is recognized and a specified pen input event 151 (e.g., a hovering event) occurs by the electronic pen 200, the electronic device 100 may output an input area (e.g., a control window 154) related to operation of the electronic pen 200 to an input device (e.g., the display 150). If a specified input event (e.g., a touch gesture on the control window 154) occurs on the basis of the control window 154, the electronic device 100 may perform a pen-related function (e.g., at least one of movement of the control window 154, movement of an input screen, or output of a pen attribute changing window) corresponding to the specified input event.

According to an embodiment of the present disclosure, the electronic device 100 may include a structure to or from which the electronic pen 200 is attachable or detachable. The electronic device 100 may electronically or functionally recognize whether the electronic pen 200 is attached or detached. If the electronic pen 200 is changed in state from a coupled state to a separated state, the electronic device 100 may activate a function related to operation of the electronic pen 200. For example, if an event related to use of the electronic pen 200 (e.g., an event that occurs in response to separation of the inserted electronic pen 200) occurs, the electronic device 100 may automatically activate a memo function or a drawing function.

Figure 2:
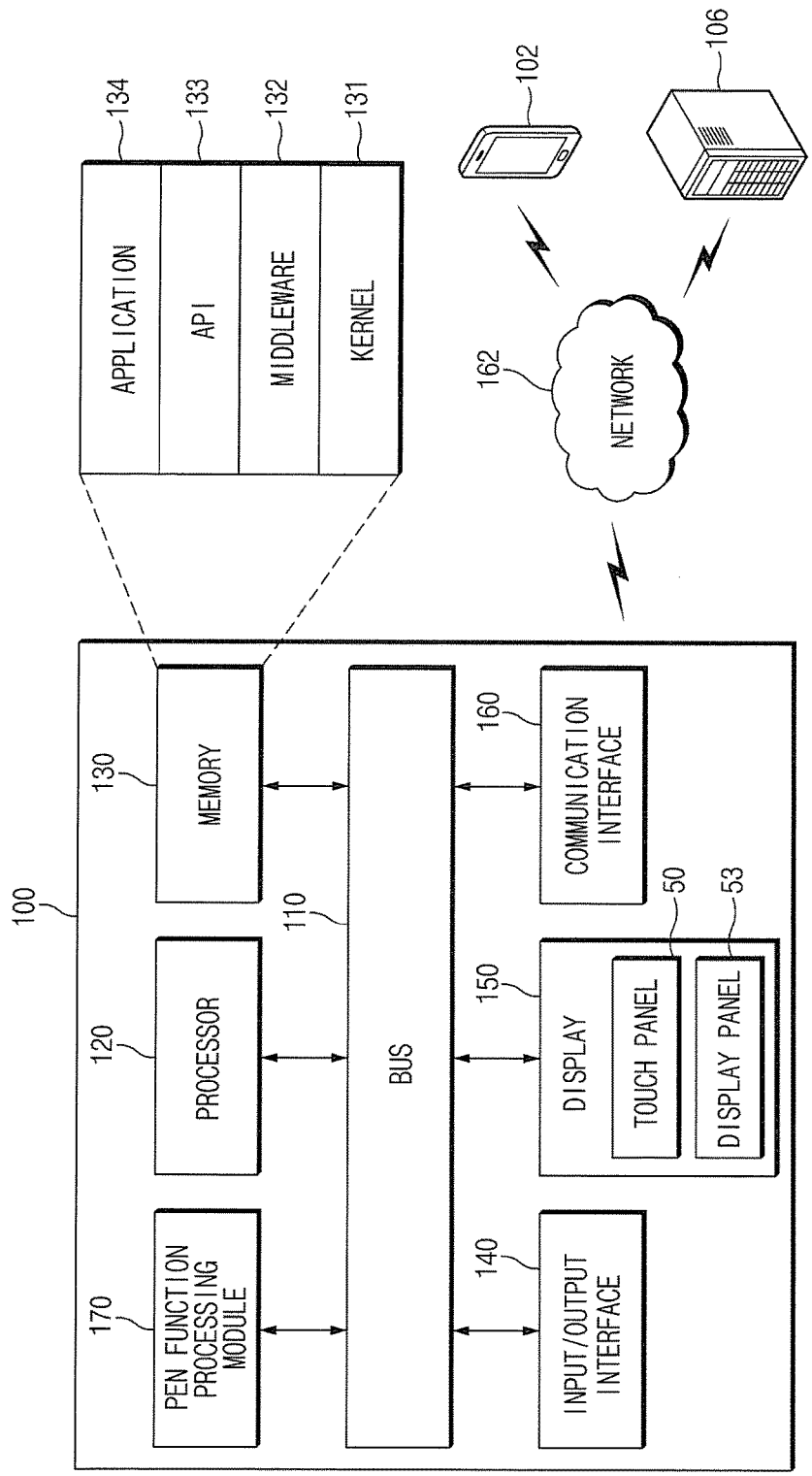
FIG. 2 illustrates an electronic device operation environment related to operation of an electronic pen according to various embodiments of the present disclosure.

FIG. 2 illustrates an electronic device operation environment related to operation of an electronic pen according to various embodiments of the present disclosure.

Referring to FIG. 2, the electronic device operation environment may include the electronic device 100, a network 162, an electronic device 102, and a server device 106.

In the above-mentioned electronic device operation environment, the network 162 may establish a communication channel between the electronic device 100 and the electronic device 102. The network 162 may include, for example, network device elements related to establishment of a mobile communication channel. Alternatively, the network 162 may include network device elements related to establishment of an Internet communication channel. The network 162 may support data transmission/reception between the electronic device 100 and the electronic device 102. Furthermore, the network 162 may support data transmission/reception between the electronic device 100 and the server device 106. According to an embodiment of the present disclosure, the network 162 may support establishment of a communication channel used to transmit content generated corresponding to operation of the electronic pen 200 from the electronic device 100 to the electronic device 102 or the server device 106.

The server device 106 may establish a communication channel to the electronic device 100 or the electronic device 102 via the network 162. According to an embodiment of the present disclosure, the server device 106 may store content generated on the basis of operation of the electronic pen 200 and provided by the electronic device 100. Alternatively, the server device 106 may provide content generated on the basis of operation of the electronic pen 200 to the electronic device 100 or the electronic device 102.

The electronic device 102 may establish a communication channel to a communication interface 160 of the electronic device 100. For example, the electronic device 102 may establish a short-range communication channel or a wired communication channel to the communication interface 160. According to an embodiment of the present disclosure, the electronic device 102 may establish a Bluetooth communication channel or a Wi-Fi direct communication channel to the communication interface 160. The electronic device 102 may receive content generated on the basis of operation of the electronic pen 200 from the electronic device 100, or may provide the content to the electronic device 100. In relation to this operation, the electronic device 102 may be an electronic pen operation supportable device.

The electronic device 102 may establish a communication channel to the electronic device 100 via the network 162. For example, the electronic device 102 may include a cellular communication module, and may establish a mobile communication channel to the electronic device 100. Alternatively, the electronic device 102 may include a Wi-Fi communication module, and may establish a Wi-Fi communication channel to the electronic device 100. The electronic device 100 may establish a communication channel to at least one of the electronic device 102 or the server device 106.

Referring to FIG. 2, the electronic device 100 may include a bus 110, a processor 120, a memory 130, an input/output interface 140, the display 150, a communication interface 160, and a pen function processing module 170.

The bus 110 may be a circuit for connecting the above-mentioned elements to each other and transferring communications (e.g., control messages, input events, data, or the like) between the above-mentioned elements. For example, the bus 110 may transfer an input signal input through the input/output interface 140 to at least one of the processor 120 or the pen function processing module 170. The bus 110 may transfer an event related to attachment or detachment of the electronic pen 200 to the pen function processing module 170. The bus 110 may transfer, to the pen function processing module 170 or the processor 120, an input event related to approach or contact of the electronic pen 200 to a certain portion of the electronic device 100.

The processor 120 may receive instructions from other elements (e.g., the memory 130, the input/output interface 140, the display 150, the communication interface 160, or the pen function processing module 170) through the bus 110. The processor 120 may interpret the received instructions, and may perform operations or process data corresponding to the interpreted instructions. The processor 120 may include the pen function processing module 170 or may be separated from the pen function processing module 170.

In the case where the processor 120 is separated from the pen function processing module 170, the processor 120 may communicate with the pen function processing module 170 directly or via the bus 110. The processor 120 may support processing of a function related to operation of a pen according to various embodiments of the present disclosure.

The memory 130 may store an instruction or data received from or generated by the processor 120 or another element (e.g., the input/output interface 140, the display 150, the communication interface 160, or the pen function processing module 170). The memory 130 may include programming modules such as a kernel 131, a middleware 132, an application programming interface (API) 133, or an application 134. Each programming module may include software, firmware, hardware, or a combination of at least two thereof.

The kernel 131 may control or manage system resources (e.g., the bus 110, the processor 120, or the memory 130) used to perform an operation or function of another programming module, for example, the middleware 132, the API 133, or the application 134. Furthermore, the kernel 131 may provide an interface for the middleware 132, the API 133, or the application 134 to access individual elements of the electronic device 100 in order to control or manage the elements.

The middleware 132 may serve as an intermediary between the API 133 or the application 134 and the kernel 131 so that the API 133 or the application 134 communicates and exchanges data with the kernel 131. Furthermore, the middleware 132 may perform a control operation (e.g., scheduling or load balancing) with respect to operation requests received from the application 134 by using, e.g., a method of assigning a priority for using system resources (e.g., the bus 110, the processor 120, or the memory 130) of the electronic device 100 to at least one application 134.

The API 133 may be an interface for allowing the application 134 to control functions provided by the kernel 131 or the middleware 132. The API 133 may include at least one interface or function (e.g., an instruction) for, for example, file control, window control, image processing, or character control.

According to various embodiments of the present disclosure, the application 134 may include at least one application related to operation of the electronic pen 200. For example, the application 134 may include a memo input application, a drawing application, or the like. A specified application related to operation of the electronic pen 200, among the applications 134, may be automatically executed if the electronic pen 200 mounted on the electronic device 100 is detached from the electronic device 100. According to various embodiments of the present disclosure, the application 134 may include a program related to a pen support function. The program related to a pen support function may be automatically executed if an application related to operation of the electronic pen 200 is activated. The program related to a pen support function may be executed through menu selection corresponding to a user setting. The program related to a pen support function may include a control window movement function item, an input screen movement function item, and a pen attribute changing window output function item.

The input/output interface 140 may transfer an instruction or data input by a user through an input/output device (e.g., a sensor, a keyboard, or a touch screen) to the processor 120, the memory 130, the communication interface 160, or the pen function processing module 170 through the bus 110. For example, the input/output interface 140 may provide, to the processor 120 or the pen function processing module 170, a touch event input through the touch screen. According to various embodiments of the present disclosure, in the case where the electronic device 100 is provided with a plurality of touch panels, the input/output interface 140 may differentiate touch events that occur on respective touch panels to transfer the touch events to the processor 120 or the pen function processing module 170. In the case where one touch panel is provided, the input/output interface 140 may differentiate a touch event that occurs on a control window area and a touch event that occurs on another area to transfer the touch events to the processor 120 or the pen function processing module 170. According to various embodiments of the present disclosure, the input/output interface 140 may transfer, to the processor 120 or the pen function processing module 170, location information of the touch panel and touch-type information (e.g., input information corresponding to a touch motion such as tap or drag).

According various embodiments of the present disclosure, the input/output interface 140 may perform a function related to audio processing. In detail, the input/output interface 140 may include one or more speakers and/or one or more microphones. For example, the input/output interface 140 may output, through the speaker, audio data related to a screen output to the display 150 according to control by the pen function processing module 170. According to an embodiment of the present disclosure, the input/output interface 140 may output at least one of audio data in response to occurrence of an input event related to attachment or detachment of the electronic pen 200, audio data related to execution of the control window 154, an effect sound corresponding to movement of an input screen, or audio data related to output or application of a pen attribute changing window. The output of the audio data or effect sound of the input/output interface 140 may be skipped corresponding to a user setting or whether the output is supported by the electronic device 100.

The display 150 may display various information (e.g., multimedia data, text data, or the like). For example, the display 150 may output a lock screen, a standby screen, or the like. The display 150 may output a specific function execution screen such as a sound source playback application execution screen, a video playback application execution screen, a broadcast receiving screen, or the like corresponding to execution of a function. According to an embodiment of the present disclosure, the display 150 may output at least one screen related to pen operation of the electronic device 100. For example, the display 150 may output an active screen of the application 134 related to the electronic pen 200. According to various embodiments of the present disclosure, the display 150 may output a hovering screen corresponding to a hovering state of the electronic pen 200. The display 150 may output at least one of a control window, a pen attribute changing window, or an input screen. For example, the display 150 may display an input screen by the electronic pen 200, and may overlay at least one of the control window or the pen attribute changing window on the input screen. At least a part of the input screen may be displayed on the display 150, and the other part of the input screen may be displayed on the display 150 in response to an input event. If an attribute of the electronic pen 200 is changed through the pen attribute changing window, information to which the changed attribute is applied may be displayed on the display 150.

The communication interface 160 may establish a communication connection between the electronic device 100 and an external electronic device (e.g., at least one of the electronic device 102 or the server device 106). For example, the communication interface 160 may be connected to the network 162 on the basis of a wireless or wired communication technology so as to communicate with the external device. The wireless communication technology may include at least one of wireless fidelity (Wi-Fi), Bluetooth (BT), near field communication (NFC), global positioning system (GPS), or cellular communication (e.g., LTE, LTE-A, CDMA, WCDMA, UMTS, WiBro, or GSM). The wired communication technology may include at least one of universal serial bus (USB), high definition multimedia interface (HDMI), recommended standard 232 (RS-232), or plain old telephone service (POTS).

According to an embodiment of the present disclosure, the network 162 may be a telecommunications network. The telecommunications network may include at least one of a computer network, the Internet, the Internet of things, or a telephone network. According to an embodiment of the present disclosure, a protocol (e.g., a transport layer protocol, a data link layer protocol, or a physical layer protocol) for communication between the electronic device 100 and an external device may be supported by at least one of the application 134, the application programming interface 133, the middleware 132, the kernel 131, or the communication interface 160.

The communication interface 160 may transmit, to another electronic device (e.g., the electronic device 102 or the serer device 106), content generated corresponding to operation of the electronic pen 200 (e.g., text content or image content). The communication interface 160 may receive, from the other electronic device, content generated corresponding to operation of the electronic pen 200. According to the various embodiments of the present disclosure, the communication interface 160 may transmit or receive, to or from the other electronic device, pen attribute changing window information related to operation of the electronic pen 200. The pen attribute changing information may include information for changing or updating the pen attribute changing window set in the electronic device 100.

Figure 3:
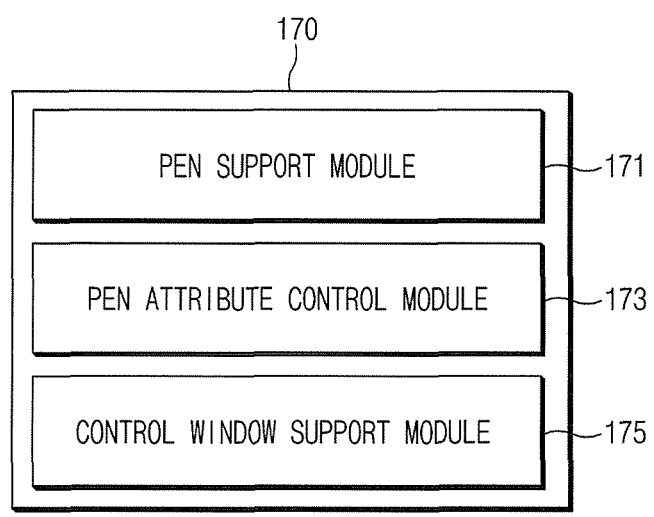
FIG. 3 illustrates an example of a pen function processing module according to various embodiments of the present disclosure.

FIG. 3 illustrates an example of a pen function processing module according to various embodiments of the present disclosure.

Referring to FIG. 3, the pen function processing module 170 may include a pen support module 171, a pen attribute control module 173, and a control window support module 175.

The pen support module 171 may process a signal related to performance of a function of the electronic pen 200. For example, the pen support module 171 may check whether the electronic pen 200 is mount on or separated from the electronic device 100. If the electronic pen 200 is separated from the electronic device 100, the pen support module 171 may process an initial setting related to operation of the electronic pen 200. Alternatively, if the electronic pen 200 is separated from the electronic device 100, the pen support module 171 may perform control so that a specified application is executed automatically.

According to various embodiments of the present disclosure, if the electronic pen 200 is separated from the electronic device 100, the pen support module 171 may process device initialization related to recognition of the electronic pen 200. For example, in the case where the electronic pen 200 supports an input function based on electromagnetic induction, the pen support module 171 may activate a pen touch panel related to the electronic pen 200 if the electronic pen 200 is separated from the electronic device 100. If the electronic pen 200 is mounted on the electronic device 100, the pen support module 171 may inactivate the pen touch panel.

The pen support module 171 may collect a specific touch event (e.g., a touch event that occurs by the electronic pen 200) corresponding to operation of the electronic pen 200, and may process a text input or drawing input corresponding to the specific touch event. In relation to this operation, the pen support module 171 may output a character input window (e.g., an input window including at least one virtual button on which at least one character is displayed) related to a text input. The pen support module 171 may process an input of a character corresponding to a virtual button selected from the character input window. The pen support module 171 may output a drawing input window. The pen support module 171 may process a drawing input in response to a touch event that occurs on the drawing input window by the electronic pen 200.

According to various embodiments of the present disclosure, the pen support module 171 may request the control window support module 175 to output the control window if a specified input event occurs by the electronic pen 200. According to an embodiment of the present disclosure, the pen support module 171 may request the control window support module 175 to output the control window, in response to a hovering state of the electronic pen 200, a specific touch gesture by the electronic pen 200, or a hovering gesture by the electronic pen 200.

According to various embodiments of the present disclosure, if an attribute of the electronic pen 200 is changed through the pen attribute changing window, the pen support module 171 may process an input from the electronic pen 200 of which the attributed has been changed. For example, if an input displayed by the electronic pen 200 is changed in terms of an attribute related to a line width, the pen support module 171 may operate so that a line (or a character or the like) is displayed with a width corresponding to the changed attribute. If an input displayed by the electronic pen 200 is changed in terms of an attribute related to color, the pen support module 171 may operate so that a line (or a character or the like) is displayed with a color corresponding to the changed attribute.

The pen support module 171 may perform an operation related to storage or cancellation of content generated by a pen operating function (e.g., content including at least one of text information or image information), corresponding to a user input. According to various embodiments of the present disclosure, the pen support module 171 may provide an additional list of pieces of content generated by open operation. If specific content is selected from the list, the pen support module 171 may output the content to the display 150. The pen support module 171 may update (e.g., add, or modify or delete) the content output to the display 150, corresponding to information input through operation of the electronic pen 200.

The control window support module 175 may support an operation related to output of the control window. The control window support module 175 may receive, from the pen support module 171, an input event or a request message related to activation of the control window. The control window support module 175 may output the control window to a specified area of the display 150 in response to a request from the pen support module 171. Alternatively, the control window support module 175 may output the control window to a specific area of the display 150 (e.g., an area on which additional information is not displayed). The control support module 175 may provide the control window in multiple forms. For example, the control window support module 175 may provide at least one of the control window obtained by defining a certain area for receiving a touch gesture, the control window including at least one item related to a pen attribute, or the control window allowing selection of a touch gesture input area or a pen attribute item.

If output of the control window is requested, the control window support module 175 may check a state of the input screen. The control window support module 175 may check arrangement of pieces of information displayed on the input screen, and may check an empty space (a blank area on which additional information is not displayed) to which the control window is able to be output. The control window support module 175 may output the control window to the empty space.

According to various embodiments of the present disclosure, if a plurality of empty spaces exist or the empty space has at least a certain size, the control window support module 175 may output the control window to a specific area. For example, the control window support module 175 may output the control window at a lower portion of the electronic device 100 in the empty space (e.g., a lower left side of the electronic device 100 if the electronic pen 200 is gripped by a right hand, or a lower right side of the electronic device 100 if the electronic pen 200 is gripped by a left hand). A grip state of the electronic pen 200 may be determined by a setting of the electronic device 100 or may be adjusted corresponding to a user's change of settings. According to various embodiments of the present disclosure, if a size of the empty space is smaller than a specified control window size, the control window support module 175 may adjust the size of the control window. The control window support module 175 may dispose the size-adjusted control window in the empty space. In this operation, the control window support module 175 may adjust at least one of the size, form, or content of the control window. According to various embodiments of the present disclosure, if the size of the empty space is smaller than a specified control window minimum size, the control window support module 175 may dispose the control window on a specific location. For example, the control window support module 175 may output the control window to an area where earliest information is disposed among areas to which information has been input.

According to an embodiment of the present disclosure, the control window support module 175 may process an input event input through the control window. For example, the control window support module 175 may collect a touch event that occurs on the control window (e.g., a touch event due to approach or contact of a user's finger, or a touch event due to approach or contact of the electronic pen 200) and may perform an operation related to the collected touch event. For example, if a specified touch event occurs on the control window, the control window support module 175 may transfer, to the pen attribute control module 173, information corresponding to the specified touch event.

According to various embodiments of the present disclosure, the control window support module 175 may move the control window in response to a touch event that occurs in relation to the control window (e.g., a touch event of touching a specific area of the control window and then dragging the specific area, for example, a touch event of touching two points of edges of the control window and then dragging the two points). The control window support module 175 may move the input screen in response to a specific event that occurs in relation to the control window (e.g., a touch event of touching and dragging at least one point of edges of the control window, for example, a touch event of touching and dragging three points of the edges of the control window).

The pen attribute control module 173 may output a specific pen attribute changing window corresponding to information provided by the control window support module 175. For example, if a specified touch event (e.g., a touch event of touching vertically) is received through the control window from the control window support module 175, the pen attribute control module 173 may output a popup window including a pen attribute changing window item to an area where the electronic pen 200 hovers. If an event of selecting the popup window including the attribute changing window item (e.g., an event of selecting a virtual button to which a "confirmation" or "electronic pen" item is assigned) occurs, the pen attribute control module 173 may output the pen attribute changing window related to control of a pen attribute.

According to an embodiment of the present disclosure, if an input event of selecting a button provided to the electronic pen 200 is received while the electronic pen 200 hovers, the pen attribute control module 173 may switch between an eraser function (or mode) and a pen function (or mode). According to an embodiment of the present disclosure, if a specified touch event (e.g., a touch event of touching horizontally) is received through the control window, the pen attribute control module 173 may output the pen attribute changing window that allows selection of a width of the electronic pen 200 to an area where the electronic pen 200 hovers. After outputting the pen attribute changing window that allows selection of a width, the pen attribute control module 173 may adjust an input width of the electronic pen 200 corresponding to a selected item. According to an embodiment of the present disclosure, if a specified touch event (e.g., a touch event of touching a certain area of the control window multiple times (e.g., twice)) is received through the control window, the pen attribute control module 173 may output the pen attribute changing window that allows selection of color to an area where the electronic pen 200 hovers. According to an embodiment of the present disclosure, if a specified touch event (e.g., a gesture event of drawing a circle clockwise) is received through the control window, the pen attribute control module 173 may magnify a currently operating input screen or may perform redoing of a previous input in an area where the electronic pen 200 hovers. According to an embodiment of the present disclosure, if a specified touch event (e.g., a gesture event of drawing a circle counterclockwise) is received through the control window, the pen attribute control module 173 may reduce a currently operating input screen to a certain ratio or may perform undoing of a previous input in an area where the electronic pen 200 hovers (or a specified area). According to various embodiments of the present disclosure, the pen attribute control module 173 may apply different magnifying or reducing ratios corresponding to a size of a circle drawn.

As described above, according to various embodiments of the present disclosure, an electronic device according to an embodiment of the present disclosure may include a display for outputting a control window related to operation of an electronic pen in response to occurrence of a specified event related to the electronic pen, and a pen function processing module configured to process a function related to the operation of the electronic pen corresponding to a specific event that occurs on the basis of the control window.

According to various embodiments of the present disclosure, an electronic device according to an embodiment of the present disclosure may include a memory for storing a control window related to an execution attribute of an electronic pen, and a pen function processing module connected to the memory, wherein the pen function processing module may adjust the execution attribute (e.g., at least one of a width, a color, or a style of a line displayed due to a touch of the electronic pen) corresponding to a specific event that occurs on the basis of the control window.

As described above, according to various embodiments of the present disclosure, an electronic device according to an embodiment of the present disclosure may include an input device (e.g., a display including an input panel (e.g., at least one of an electromagnetic induction panel or a touch panel) for processing an input event for adjusting an execution attribute of an electronic pen and a display panel for outputting an object (or a partial screen area, an input display area, or the like) indicating a reception area of an input event related to the execution attribute of the electronic pen), and a pen function processing module for processing a function related to the operation of the electronic pen (e.g., adjusting the execution attribute of the electronic pen) corresponding to a specified event input through the input area. According to various embodiments of the present disclosure, the pen function processing module may adjust at least one of a size, a form, or a location of the output input area corresponding to an input event.

According to various embodiments of the present disclosure, the pen function processing module may output a window related to selection of one of a pen function related to information input and an eraser function related to modification or deletion of input information corresponding to a touch event that occurs on the input area, or may magnify a screen related to information input or perform redoing of a previous input corresponding to the touch event that occurs on the input area, or may reduce the screen related to information input or perform undoing of the previous input corresponding to the touch event that occurs on the input area.

According to various embodiments of the present disclosure, the display may include a touch panel for receiving a hovering event relate to the electronic pen or an event of maintaining a hovering state for a specified time.

According to various embodiments of the present disclosure, the pen function processing module may perform control so that a pen attribute changing window related to change of a pen attribute is output to an electronic pen hovering portion of the display.

According to various embodiments of the present disclosure, the pen function processing module may perform control so that another-type pen attribute changing window is output corresponding to the type of an event that occurs on the input area.

According to various embodiments of the present disclosure, the pen function processing module may control output of at least one of the pen attribute changing window related to adjustment of a width of the electronic pen, the pen attribute changing window related to adjustment of a color of the electronic pen, or the pen attribute changing window related to adjustment of a style of the electronic pen, corresponding to the touch event that occurs on the input area.

According to various embodiments of the present disclosure, the pen function processing module may remove at least one of the pen attribute changing window or the input area from the display when a specific item is selected from the pen attribute changing window or when the hovering state of the electronic pen is released.

According to various embodiments of the present disclosure, the pen function processing module may move a screen corresponding to movement of the input area.

According to various embodiments of the present disclosure, the pen function processing module may perform at least one of control of outputting the input area to a specified portion of the display, control of changing an output position of the input area corresponding to a grip direction of the electronic pen, control of outputting the input area to an area of the display where information is not displayed, control of outputting the input area to an area having a size larger than a specified size of the input area, among areas of the display where information is not displayed, control of outputting the input area to an area located at an opposite side to the grip direction, among the areas of the display where information is not displayed, control of outputting the input area to a largest area among the areas of the display where information is not displayed, or control of outputting the input area to a specified information display area if none of the areas of the display where information is not displayed has a size larger than a specified minimum size of the input area.

Figure 4:
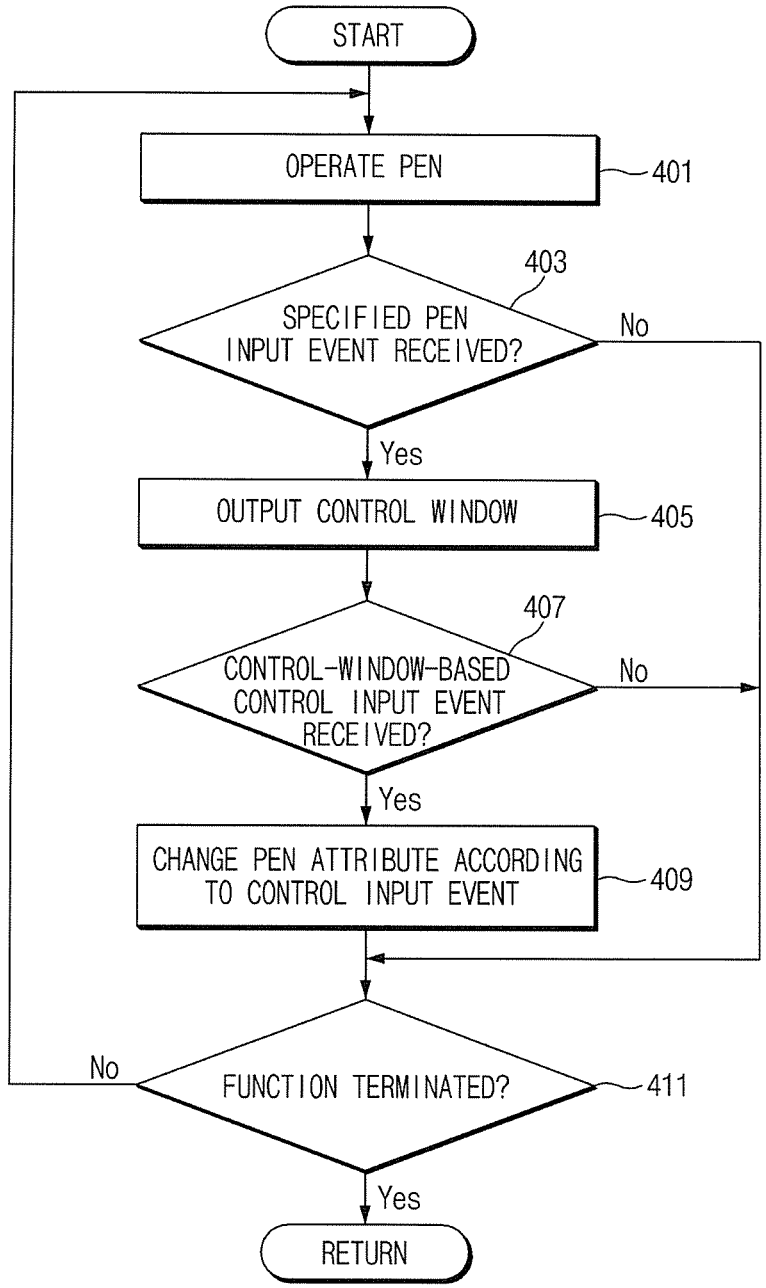
FIG. 4 illustrates an electronic pen operating method according to various embodiments of the present disclosure.

FIG. 4 illustrates an electronic pen operating method according to various embodiments of the present disclosure.

Referring to FIG. 4, the pen function processing module 170 may support pen operation in operation 401. For example, the pen function processing module 170 may recognize approach or contact of the electronic pen 200 and may collect a touch event due to the approach or contact of the electronic pen 200. The pen function processing module 170 may perform text input or may process drawing input corresponding to the touch event that occurs.

In operation 403, the pen function processing module 170 may determine whether a specified pen input event is received. For example, the pen function processing module 170 may determine whether the specified input event occurs in relation to output of an input area (e.g., the control window). According to an embodiment of the present disclosure, the pen function processing module 170 may determine whether a specified hovering event (e.g., a hovering event that occurs on an arbitrary touch panel portion or a specified touch panel portion, or a hovering event of a specified gesture type) occurs with respect to the control window. If the specified pen input event is not received, the process may proceed to operation 411 so that the pen function processing module 170 may process a function corresponding to a function termination event.

If the specified pen input event is received, the pen function processing module 170 may output the control window in operation 405. For example, the pen function processing module 170 may output the control window having a specified size or form to a certain portion of the display 150. According to an embodiment of the present disclosure, the pen function processing module 170 may output the control window at a specified portion (e.g., a lower left side portion or a lower right side portion of the display 150) or at an arbitrary portion of the display 150 where information is not displayed. Alternatively, the pen function processing module 170 may output the control window to a portion to which the control window has been previously output. The control window may be output in the form of at least one of a virtual pad that supports a gesture-type control input event or a list that supports a selective control input event.

In operation 407, the pen function processing module 170 may determine whether a control-window-based control input event is received. If the control-window-based control input event is received, the pen function processing module 170 may perform change of a pen attribute according to the control input event. For example, if a specified gesture event occurs on the control window, the pen function processing module 170 may output the pen attribute changing window for changing the pen attribute corresponding to the gesture event. For example, if a vertical gesture event occurs on the control window, the pen function processing module 170 may output the pen attribute changing window including at least one item related to change of the width of the electronic pen 200 to a hovering area of the electronic pen 200 or an area adjacent to the hovering area.

According to various embodiments of the present disclosure, the pen function processing module 170 may automatically change an attribute of the electronic pen corresponding to a specific gesture without outputting the pen attribute changing window. For example, the pen function processing module 170 may change at least one of the width or the color of the electronic pen corresponding to a character-type gesture event input through the control window. According to an embodiment of the present disclosure, if the character "B" is input through the control window, the pen function processing module 170 may change the color of the attribute of the electronic pen 200 into "black". According to an embodiment of the present disclosure, if the numeral "3" is input through the control window, the line width of the electronic pen 200 may be changed to a width corresponding to the numeral "3". In relation to this operation, the electronic device may store and operate a mapping table in which a numeral or a specific initial or character is mapped to an attribute value.

According to various embodiments of the present disclosure, the pen function processing module 170 may temporarily output, to an electronic pen hovering area, information on a color or a width to be applied corresponding to a character input through the control window. For example, the pen function processing module 170 may dispose a reference icon (e.g., a Go game icon) in the electronic pen hovering area. The pen function processing module 170 may adjust the size of the reference icon corresponding to a size of a numeral input through the control window so that width change may be recognized intuitively. The pen function processing module 170 may adjust the color of the reference icon corresponding to a character input through the control window so that color change may be recognized intuitively. The above-mentioned control-window-based character input method may be such implemented that input of a specified initial or an entire word is recognized.

If the control-window-based control input event is not received, the process may proceed to operation 411 so that the pen function processing module 170 may process a function corresponding to a function termination event. The pen function processing module 170 may determine whether an event related to functional termination occurs in operation 411. If the event related to function termination (e.g., an event of mounting the electronic pen 200, or an event of instructing to terminate a function related to the electronic pen 200) occurs, the pen function processing module 170 may terminate a function related to the electronic pen 200 and may return to an execution state of a specific function (e.g., a function executed in the electronic device 100 before execution of the function related to the electronic pen 200). Alternatively, the pen function processing module 170 may perform a switching to a standby screen or a home screen in response to an occurrence of the function termination event. If the function termination event does not occur, the process may return to operation 401 so that the pen function processing module 170 may control processing of an input event input by the electronic pen 200. According to various embodiments of the present disclosure, if a specified event does not occur within a certain time after the control window is output, the pen function processing module 170 may remove the control window from the display 150.

According to various embodiments of the present disclosure, the above-mentioned input area (e.g., the control window) may be an entire area of an input device (e.g., the display 150). Furthermore, the input area may be output to the input device with a certain degree of transparency. For example, the input area may be displayed transparently (e.g., transparently displayed in a bent form so as to be distinguished from an adjacent area).

According to various embodiments of the present disclosure, the electronic device may provide the input area related to operation of the electronic pen by default. Alternatively, the electronic device may automatically output the input area related to operation of the electronic pen corresponding to the type of an application executed. In this case, an operation of receiving a specified event may be skipped.

As described above, according to various embodiments of the present disclosure, a method for operating an electronic pen of an electronic device according to an embodiment of the present disclosure may include receiving a specified event related to the electronic pen, outputting a control window related to operation of the electronic pen in response to occurrence of the specified event, receiving a specific event on the basis of the control window, and processing a function related to the operation of the electronic pen corresponding to the specific event.

A method for operating an electronic pen of an electronic device according to an embodiment of the present disclosure may include outputting, to a display, an input area for adjusting an execution attribute of the electronic pen (e.g., at least one of a width, a color, or a style (or a form) of a line input by the electronic pen) and receiving a specified event, receiving the specified event on the basis of the input area, and processing a function related to operation of the electronic pen corresponding to the specified event.

The outputting to the display may include defining an area corresponding to the input area on at least one of a first touch panel for receiving an event that occurs by the electronic pen or a second touch panel for receiving an event that occurs by a tool (e.g., a finger or the like) other than the electronic pen, and outputting an object (e.g., an input display area, the control window 154, or the like) corresponding to the input area to a portion of a display panel which corresponds to the input area defined on at least one of the first touch panel or the second touch panel.

As described above, according to various embodiments of the present disclosure, a method for operating an electronic pen of an electronic device according to an embodiment of the present disclosure may include outputting an input area related to operation of the electronic pen in response to occurrence of a specified event, receiving a specific event input to the input area, and processing a function related to the operation of the electronic pen corresponding to the specific event.

According to various embodiments of the present disclosure, the method may further include adjusting at least one of a size, a form, or a location of the output input area corresponding to an input event.

According to various embodiments of the present disclosure, the processing of the function may include at least one of outputting a window related to selection of one of a pen function related to information input and an eraser function related to modification or deletion of input information corresponding to a touch event that occurs on the input area, magnifying a screen related to information input or performing redoing of a previous input corresponding to the touch event that occurs on the input area, and reducing the screen related to information input or performing undoing of the previous input corresponding to the touch event that occurs on the input area.

According to various embodiments of the present disclosure, the receiving of the specified event may include at least one of receiving a hovering event related to the electronic pen and receiving an event of maintaining a hovering state of the electronic pen for a certain time.

According to various embodiments of the present disclosure, the processing of the function may include outputting a pen attribute changing window related to change of an attribute of the electronic pen to a hovering place of the electronic pen.

According to various embodiments of the present disclosure, the processing of the function may include outputting another-type pen attribute changing window corresponding to the type of an event that occurs on the input area.

According to various embodiments of the present disclosure, the outputting of the pen attribute changing window may include at least one of outputting the pen attribute changing window related to adjustment of a width of the electronic pen corresponding to the touch event that occurs on the input area, outputting the pen attribute changing window related to adjustment of a color of the electronic pen corresponding to the touch event that occurs on the input area, and outputting the pen attribute changing window related to adjustment of a style of the electronic pen corresponding to the touch event that occurs on the input area.

According to various embodiments of the present disclosure, the method may further include removing at least one of the pen attribute changing window or the input area from the display when a specific item is selected from the pen attribute changing window or when the hovering state of the electronic pen is released.

According to various embodiments of the present disclosure, the processing of the function may include moving a screen corresponding to movement of the input area.

According to various embodiments of the present disclosure, the outputting of the input area may include at least one of outputting the input area to a specified portion of the display, changing an output position of the input area corresponding to a grip direction of the electronic pen, outputting the input area to an area of the display where information is not displayed, outputting the input area to an area having a size larger than a specified size of the input area, among areas of the display where information is not displayed, outputting the input area to an area located at an opposite side to the grip direction, among the areas of the display where information is not displayed, outputting the input area to a largest area among the areas of the display where information is not displayed, and outputting the input area to a specified information display area if none of the areas of the display where information is not displayed has a size larger than a specified minimum size of the input area.

Figure 5:
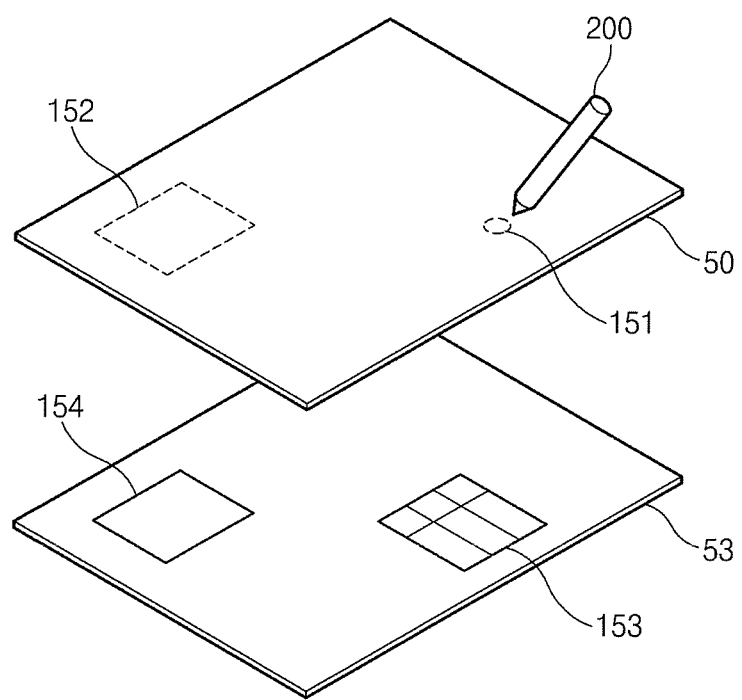
FIG. 5 illustrates an example of a display related to operation of an electronic pen according to various embodiments of the present disclosure.

FIG. 5 illustrates an example of a display related to operation of an electronic pen according to various embodiments of the present disclosure.

Referring to FIG. 5, the display 150 of the electronic device 100 may include a display panel 53 and a touch panel 50.

The display panel 53 may output various screens related to operation of the electronic device 100. For example, the display panel 53 may output a home screen, a standby screen, or the like. According to various embodiments of the present disclosure, the display panel 53 may output a screen corresponding to execution of an application (e.g., a memo input application, a drawing application, or the like) related to operation of the electronic pen 200. According to an embodiment of the present disclosure, the display panel 53 may output the control window 154. Furthermore, the display panel 53 may output a pen attribute changing window 153. The control window 154 may be output to a certain area, for example, a lower-left-side certain area, with a specific size as illustrated in FIG. 5. At least one of the size, a form, or an output position on the display panel 53 of the control 154 may be changed corresponding to a setting or a user input. For example, an initial output position of the control window 154 may be changed to a lower-right-side area, an upper-left-side area, an upper-right-side area, or the like. The position of the control window 154 on the display panel 53 may be changed corresponding to a user input (e.g., an event of selecting and dragging three points of edges of the control window 154), regardless of the output position.

The pen attribute changing window 153 may be output to, for example, a portion where the electronic pen 200 is disposed (e.g., a portion contacted or approached by the electronic pen 200). The pen attribute changing window 153 may have at least one of various types corresponding to the type of an input event. For example, the pen attribute changing window 153 may include at least one of a confirmation window for selecting a pen function or an eraser function, a window related to change of a pen width, a window related to change of a pen color, a window related to magnification or reduction of an input screen, or a window related to redoing or undoing of input information.

The touch panel 50 may be disposed on at least one of an upper portion or a lower portion of the display panel 53. The touch panel 50 may generate a hovering event in response to approach of the electronic pen 200. The touch panel 50 may generate a pen touch event in response to contact of the electronic pen 200. According to various embodiments of the present disclosure, the touch panel 50 may generate at least one of the hovering event or the pen touch event in response to approach or contact of a finger. The touch panel 50 may detect an area where a hovering event 151 of the electronic pen 200 occurs. According to an embodiment of the present disclosure, the display panel 53 may output a hovering indicator corresponding to the hovering event 151. Furthermore, the touch panel 53 may output an indicator corresponding to the touch event to a touch place.

The touch panel 50 may define a touch control area 152 corresponding to an output position of the control window 154 on the display panel 53. The touch panel 50 may provide, to the pen function processing module 170, a touch event that occurs on the touch control area 152 as a value differentiated from that of a touch event that occurs on another area. Alternatively, the touch panel 50 may provide, to the pen function processing module 170, the touch event together with location information indicating that the touch event occurs on the touch control area 152. The touch panel 50 may be, for example, a capacitive touch panel or a resistive touch panel.

Figure 6:
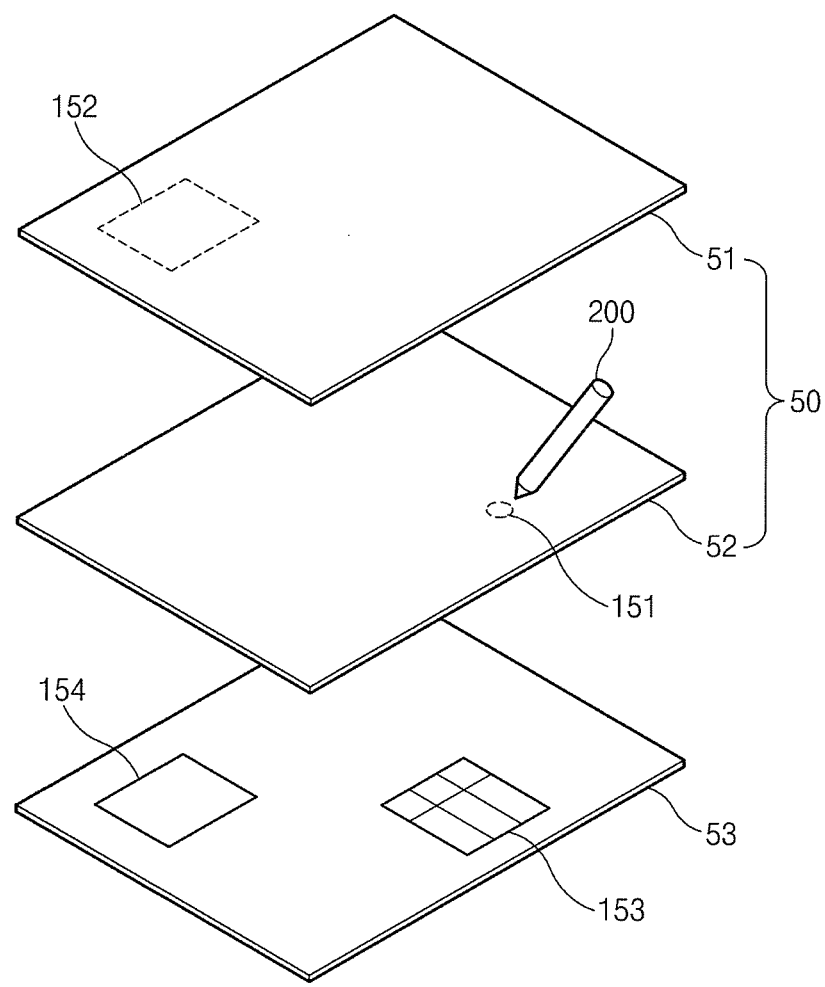
FIG. 6 illustrates another example of a display related to operation of an electronic pen according to various embodiments of the present disclosure.

FIG. 6 illustrates another example of a display related to operation of an electronic pen according to various embodiments of the present disclosure.

Referring to FIG. 6, the display 150 of the electronic device 100 may include a display panel 53 and a plurality of touch panels 50, for example, a first touch panel 51 and a second touch panel 52.

The display panel 53 may output various screens of the electronic device 100, as described above with reference to FIG. 5. Furthermore, the display panel 53 may output the control window 154 and the pen attribute changing window 153 corresponding to an event that occurs. The display panel 53 may be disposed between the touch panels 51 and 52. Alternatively, the display panel 53 may be disposed under the touch panels 51 and 52. Alternatively, the display panel 53 may be disposed on the touch panel 51 or on the touch panel 52.

The touch panel 51 may be disposed on or under the touch panel 52 or the display panel 53. The touch panel 51 may generate and transfer a touch event related to the control window 154. For example, the touch panel 51 may be provided as a capacitive touch panel and may be disposed on the display panel 53. The touch panel 51 may generate a touch event corresponding to approach or contact of a user's finger or a tool corresponding to a finger (e.g., a device capable of changing capacitance of the touch panel 51). According to an embodiment of the present disclosure, the touch panel 51 may include the touch control area 152 corresponding to an area of the control window 154 corresponding to a setting or in relation to support of a function of the control window 154. The touch panel 51 may validly treat only a touch event that occurs on the touch control area 152 (i.e., perform a function corresponding to a touch event that occurs on the area) and may transfer the touch event to the pen function processing module 170. If a function related to the control window 154 or a function related to the electronic pen 200 is terminated, the touch panel 51 may treat an entire area as a valid touch event area (an area configured to process a function corresponding to a touch event that occurs).

The touch panel 52 may be disposed on or under the touch panel 51 or the display panel 53. The touch panel 52 may collect a touch event or a hovering event related to the electronic pen 200, and may transfer the collected event to the pen function processing module 170. According to an embodiment of the present disclosure, the touch panel 52 may be an electromagnet induction-type touch panel that enables recognition of approach or contact of the electronic pen 200. The touch panel 52 may recognize the hovering event 151 while the electronic pen 200 approaches the touch panel 52 or is spaced apart therefrom by a certain distance. According to the hovering event 151 recognized by the touch panel 52 or if the hovering event 151 is maintained for a specified time, the event may be applied as an instruction related to activation of the control window 154. For example, if the hovering event 151 is collected as the electronic pen 200 approaches the touch panel 52, the display panel 53 may output the control window 154 in a specified area. The touch panel 51 may define the touch control area 152 at a corresponding area to the control window 154.

The above-mentioned panels are schematically illustrated in FIGS. 5 and 6, and driving units (e.g., a touch panel driving unit, a display panel driving unit, and the like) related to driving of the panels may be further arranged. Furthermore, in relation to operation of the driving units, the electronic device 100 may further include a power supply unit for supplying power and the processor 120 related to processing of data of the driving units.

Figure 7A:
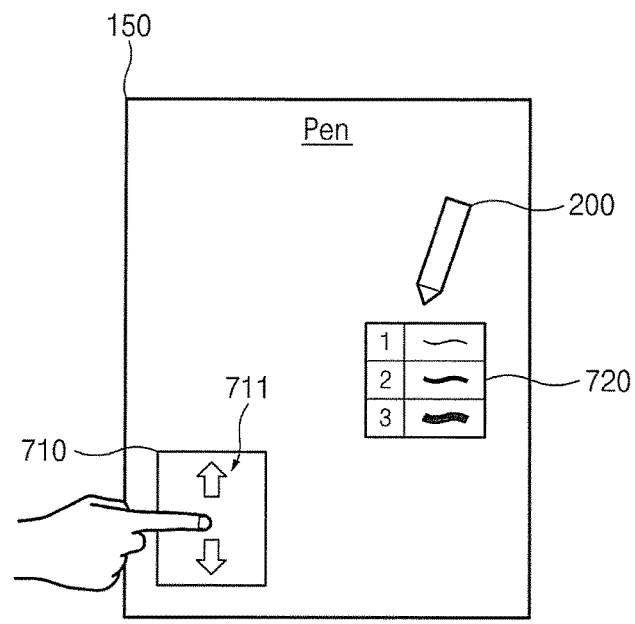
FIG. 7A illustrates an example of adjustment of an attribute of an electronic pen according to various embodiments of the present disclosure.

FIG. 7A illustrates an example of adjustment of an attribute of an electronic pen according to various embodiments of the present disclosure.

Referring to FIG. 7A, according to various embodiments of the present disclosure, the display 150 of the electronic device 100 may output a specific function screen according to a user input or schedule information. The display 150 of the electronic device 100 may have a sleep state, a lock screen state, a home screen display state, or a standby screen output state. According to an embodiment of the present disclosure, if an event related to operation of the electronic pen 200 occurs, the display 150 may output an execution screen of an application related to the electronic pen 200 as illustrated in FIG. 7A. For example, the display 150 may output an information input screen based on the electronic pen 200.

According to various embodiments of the present disclosure, if a specified event occurs by the electronic pen 200, the pen function processing module 170 may output a control window 710 to the display 150. For example, if a specified event occurs (e.g., the electronic pen 200 hovers over a specific portion of the display 150 or taps a specific portion of the display 150 multiple times, or a button of the electronic pen 200 is operated), the pen function processing module 170 may control output of the control window 710. The pen function processing module 170 may output the control window 710 for receiving a touch gesture corresponding to a setting.

If a specified event 711 occurs with respect to the control window 710, the pen function processing module 170 may output a pen attribute changing window 720 corresponding to the specified event 711 to a certain portion of the display 150. For example, the pen function processing module 170 may output the pen attribute changing window 720 to a portion of the display 150 on which the electronic pen 200 hovers. According to an embodiment of the present disclosure, the pen function processing module 170 may output the pen attribute changing window 720 for changing a pen width attribute corresponding to a type of the event 711 (e.g., a touch event of dragging vertically) that occurs on the control window 710. The pen function processing module 170 may release a display state of the pen attribute changing window 720 (or remove the pen attribute changing window 720 from the display 150) if a specific width item is selected from the pen attribute changing window 720, a certain period of time expires, or a hovering state of the electronic pen 200 is released. The pen function processing module 170 may release a display state of the control window 710 (or remove the control window 710 from the display 150) if the pen attribute changing window 720 is output, a pen attribute is changed, or the hovering state of the electronic pen 200 is released.

Figure 7B:
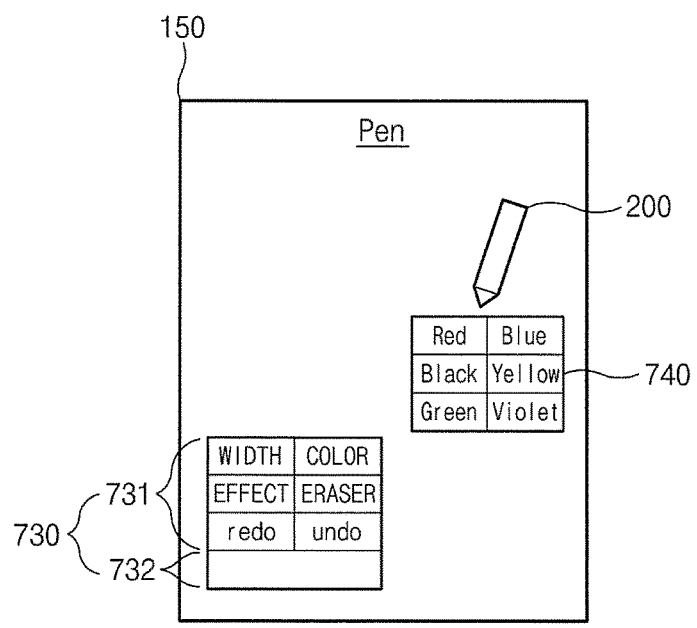
FIG. 7B illustrates another example of adjustment of an attribute of an electronic pen according to various embodiments of the present disclosure.

FIG. 7B illustrates another example of adjusting an attribute of an electronic pen according to various embodiments of the present disclosure.

Referring to FIG. 7B, according to various embodiments of the present disclosure, the pen function processing module 170 of the electronic device 100 may output an execution screen of an application related to the electronic pen 200 to the display 150 if an event related to operation of the electronic pen 200 occurs during a specific screen state (e.g., a specific function screen display state, a sleep state, a lock screen display state, a home screen display state, or a standby screen output state). For example, the pen function processing module 170 may output an information input screen for receiving information through the electronic pen 200. Alternatively, the pen function processing module 170 may process an input from the electronic pen 200 in a specific screen state.

According to an embodiment of the present disclosure, the pen function processing module 170 may output a control window 730 if a specific event is input by the electronic pen 200. For example, the pen function processing module 170 may output the control window 730 if the electronic pen 200 hovers while a function button of the electronic pen 200 is pressed. Alternatively, the pen function processing module 170 may output the control window 730 in response to occurrence of a specific event due to the electronic pen 200 (e.g., a specific touch event, a hovering gesture event, or the like). The control window 730 may include, for example, a list area 731 on which items related to pen attributes are arranged and an input area 732 related to input of a gesture event.

According to an embodiment of the present disclosure, if a "color" item is selected from the list area 731 of the control window 730, the pen function processing module 170 may output a pen attribute changing window 740 to the display 150. For example, the pen function processing module 170 may output, to a position of the electronic pen 200 (e.g., a portion of the display 150 on which the electronic pen 200 hovers), the pen attribute changing window 740 including options corresponding to the "color" item selected from the list area 731. If a specific option is selected from the pen attribute changing window 740, the pen function processing module 170 may change a color attribute of the electronic pen 200 corresponding to the selected option.

According to various embodiments of the present disclosure, the pen function processing module 170 may recognize a hovering event (e.g., this event occurs as the electronic pen 200 is disposed on a certain portion of the display 150 in relation to an input operation). The pen function processing module 170 may output the control window 730 if the hovering event is maintained for a specified time. If the hovering event occurs but is not maintained for the specified time, the pen function processing module 170 may not output a control window. Accordingly, a control window output operation may not be performed in response to the hovering event that occurs as the electronic pen 200 approaches the display 150 for the purpose of information input or is moved away from the display 150 after completion of information input. According to various embodiments of the present disclosure, the pen function processing module 170 may output the control window if the hovering event occurs as the electronic pen 200 approaches the display 150, and then, the pen function processing module 170 may remove the control window from the display 150 if a touch event occurs by the electronic pen 200. Furthermore, the pen function processing module 170 may output the control window if the hovering event occurs by the electronic pen 200 that is being moved away from the display 150, and then, the pen function processing module 170 may remove the control window from the display 150 if the hovering event is released.

Figure 8A:
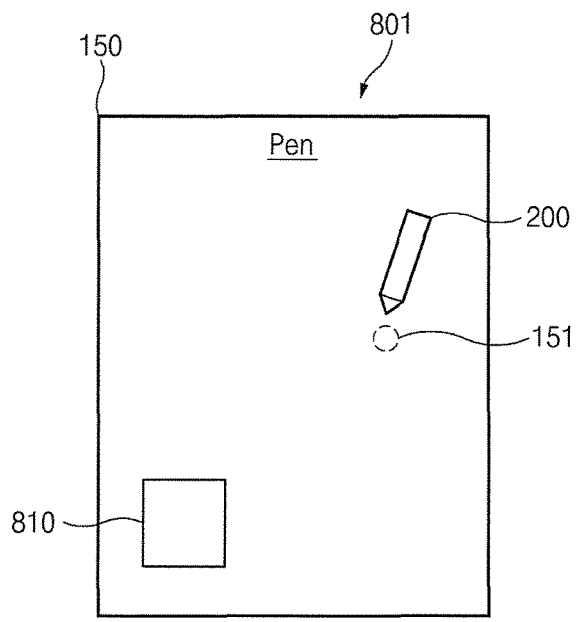
FIGS. 8A and 8B illustrate the operation of a control window according to various embodiments of the present disclosure.
Figure 8B:
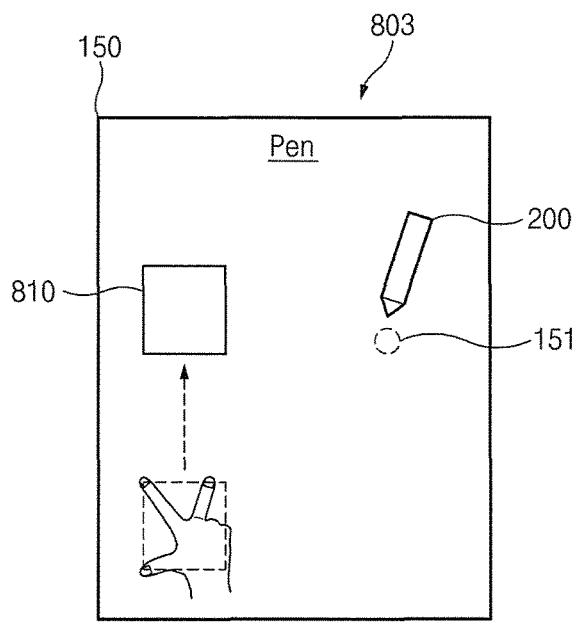

FIGS. 8A and 8B illustrate the operation of a control window according to various embodiments of the present disclosure.

Referring to FIGS. 8A and 8B, according to various embodiments of the present disclosure, the display 150 of the electronic device 100 may output a function screen (e.g., a pen function screen) related to operation of the electronic pen 200 as shown in a state 801. In relation to this operation, the pen function processing module 170 of the electronic device 100 may detect separation of the electronic pen 200 therefrom or execution of a function related to operation of the electronic pen 200. If the electronic pen 200 induces a specified event (e.g., a hovering event or a touch event maintained for a specified time, or a specified gesture-type hovering event or touch event) on an arbitrary portion or a specified area of the display 150, the pen function processing module 170 may output a control window 810 to a certain area of the display 150. According to various embodiments of the present disclosure, the pen function processing module 170 may recognize the hovering event 151 corresponding to the hovering state of the electronic pen 200. Furthermore, the pen function processing module 170 may output an indicator corresponding to the hovering event 151 to a hovering area of the display 150.

As illustrated in the state 801, if a touch event (or a specified hovering event) related to the control window 810 occurs after the control window 810 is output to the display 150, the pen function processing module 170 may control movement of the control window 810. For example, if at least a certain number of points (e.g., three points) of edges of the control window 810 are touched, the pen function processing module 170 may change a state of the control window 810 into a movable state. For example, the pen function processing module 170 may display the control window 810 such that the control window 810 is separated from a pen function screen (i.e., display the control window 810 and the pen function screen on different layers). If a drag event occurs while the touch points are selected, the pen function processing module 170 may move and display the control window 810 as illustrated in a state 803. According to various embodiments of the present disclosure, if a drag event occurs while at least a certain number of points of edges of the control window 810 are touched, the pen function processing module 170 may move and display the control window 810 in response to the occurrence of the drag event. According to an embodiment of the present disclosure, in this operation, the pen function processing module 170 may not provide a displayable state of the control window 810.

Figure 9A:
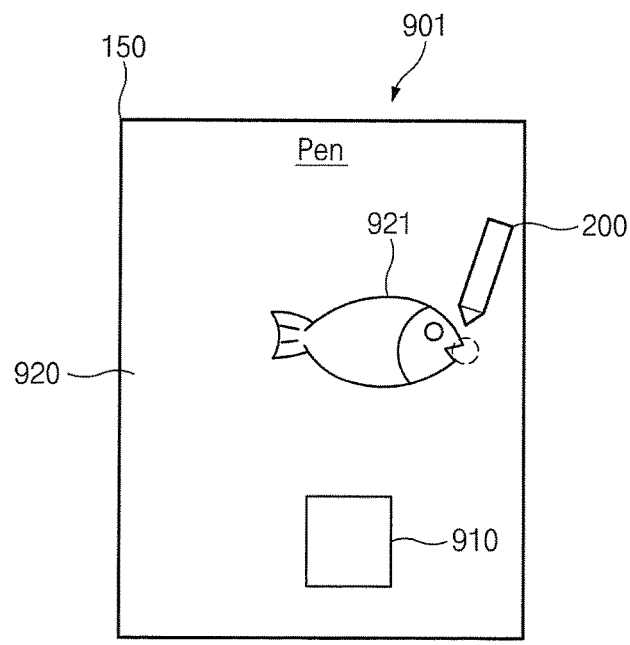
FIGS. 9A and 9B illustrate the control of an operation screen of an electronic pen according to various embodiments of the present disclosure.
Figure 9B:
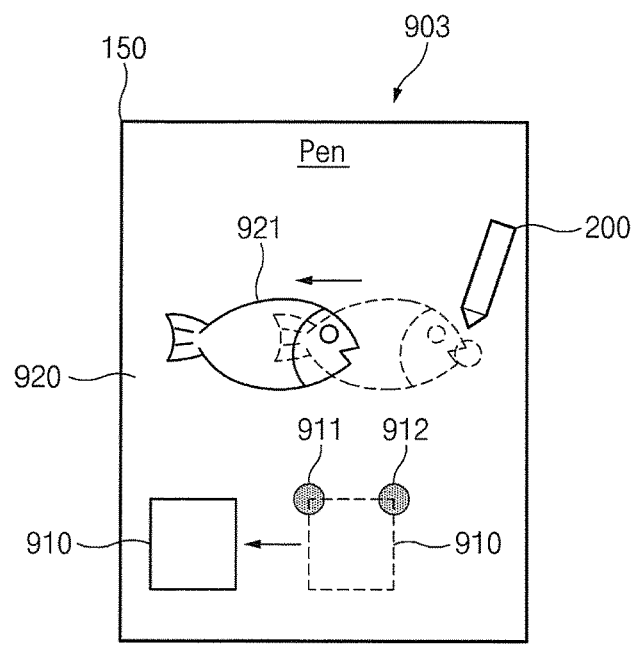

FIGS. 9A and 9B illustrate the control of an operation screen of an electronic pen according to various embodiments of the present disclosure.

Referring to FIGS. 9A and 9B, according to various embodiments of the present disclosure, the display 150 of the electronic device 100 may output a specific screen. For example, the pen function processing module 170 may output a pen function input screen 920 related to operation of the electronic pen 200 to the display 150 as shown in a state 901. If an input is generated by the electronic pen 200, the pen function processing module 170 may apply the input to the pen function input screen 920. For example, the pen function processing module 170 may output an object 921 generated by the input from the electronic pen 200 to a certain area of the pen function input screen 920. According to an embodiment of the present disclosure, if a specified event occurs by the electronic pen 200, the pen function processing module 170 may output a control window 910 to a certain area of the input screen 920.

The pen function processing module 170 may receive a specific event related to the control window 910 (e.g., a drag event of touching two points 911 and 912 of edges of the control window 910 and moving the control window 910 leftwards). If the above-mentioned specific event occurs, the pen function processing module 170 may move the pen function input screen 920 on the display 150. For example, the pen function processing module 170 may move the object 921 by a movement distance of the control window 910. In this manner, the pen function processing module 170 may support quick movement of the pen function input screen 920 without requiring additional menu selection.

Figure 10:
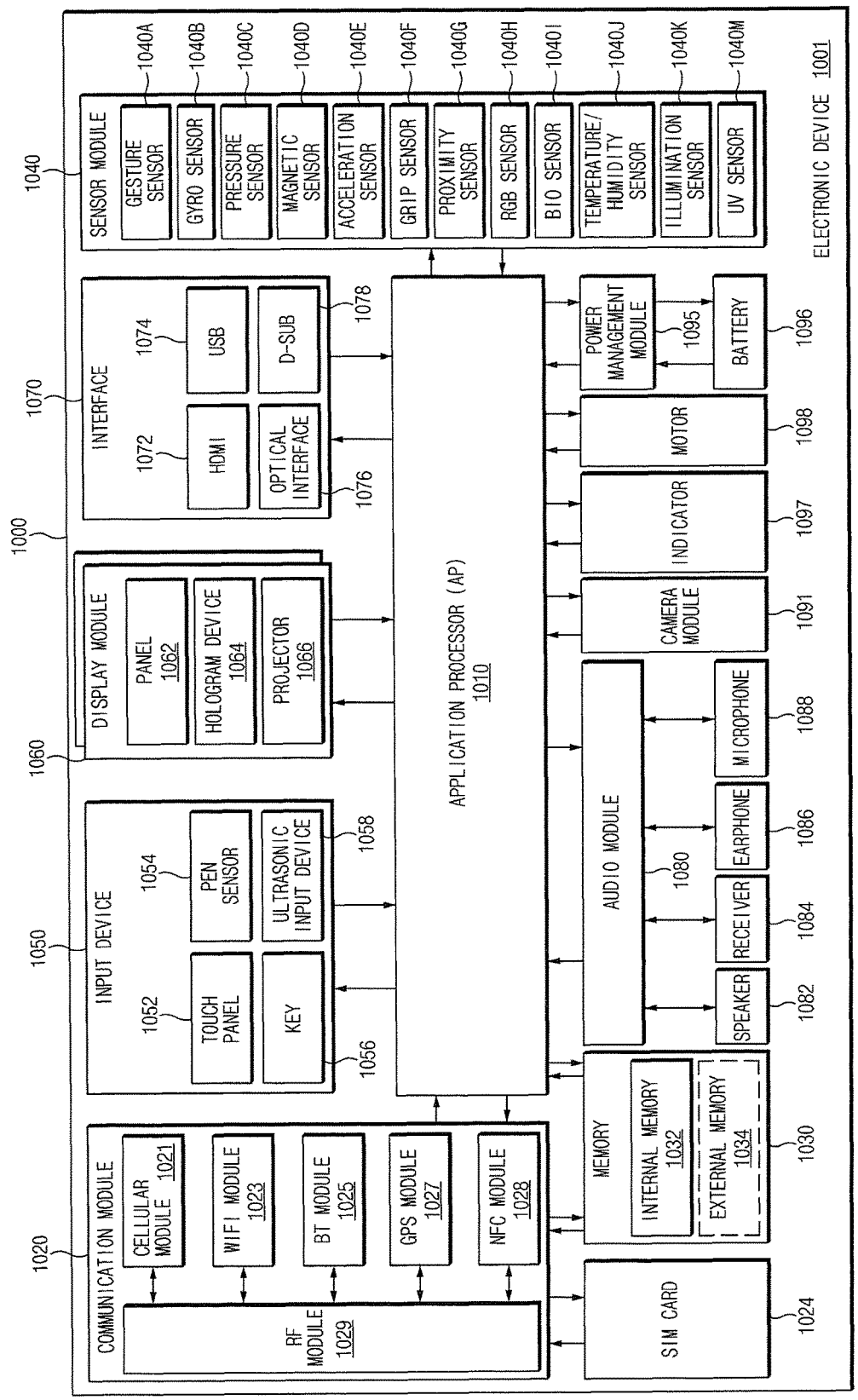
FIG. 10 is a block diagram of an electronic device 1000 according to various embodiments of the present disclosure.

FIG. 10 is a block diagram of an electronic device 1000 according to various embodiments of the present disclosure. The electronic device 1000, for example, can configure all or part of the wearable electronic device 100 shown in FIG. 6 or the main electronic device 200 shown in FIG. 9. Referring to FIG. 10, the electronic device 1000 includes application processor (AP) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 (for example, the control unit 130) controls a plurality of hardware or software components connected to the AP 1010 and also performs various data processing and operations with multimedia data by executing an operating system or an application program. The AP 1010 can be implemented with a system on chip (SoC), for example. According to an embodiment of the present disclosure, the AP 1010 further includes a graphic processing unit (GPU) (not shown).

The communication module 1020 performs data transmission and reception between the electronic device 1000 (for example, the electronic device 100) and other electronic devices connected via network. According to an embodiment of the present disclosure, the communication module 1020 includes a cellular module 1021, a WiFi module 1023, a BT module 1025, a GPS module 1027, an NFC module 1028, and a radio frequency (RF) module 1029.

The cellular module 1021 provides voice calls, video calls, text services, or internet services through a communication network (for example, LTE, LTE-A, CDMA, WCDMA, UMTS, WiBro, or GSM). Additionally, the cellular module 1021 performs a distinction and authentication operation on an electronic device in a communication network by using a subscriber identification module (for example, the SIM card 1024), for example. According to an embodiment of the present disclosure, the cellular module 1021 performs at least part of a function that the AP 1010 provides. For example, the cellular module 1021 can perform at least part of a multimedia control function.

According to an embodiment of the present disclosure, the cellular module 1021 further includes a communication processor (CP). Additionally, the cellular module 1021 can be implemented with SoC, for example. As shown in FIG. 10, components such as the cellular module 1021 (for example, a CP), the memory 1030, or the power management module 1095 are separated from the AP 1010, but according to an embodiment of the present disclosure, the AP 1010 can be implemented including some of the above-mentioned components (for example, the cellular module 1021).

According to an embodiment of the present disclosure, the AP 1010 or the cellular module 1021 (for example, a CP) loads instructions or data, which are received from a non-volatile memory or at least one of other components connected thereto, into a volatile memory and then can process them. Furthermore, the AP 1010 or the cellular module 1021 stores data received from or generated by at least one of other components in a nonvolatile memory.

Each of the WiFi module 1023, the BT module 1025, the GPS module 1027, and the NFC module 1028 includes a processor for processing data transmitted and received through a corresponding module. Although the cellular module 1021, the WiFi module 1023, the BT module 1025, the GPS module 1027, and the NFC module 1028 are shown as separate blocks in FIG. 10, according to an embodiment of the present disclosure, some (for example, at least two) of the cellular module 1021, the WiFi module 1023, the BT module 1025, the GPS module 1027, and the NFC module 1028 can be included in one integrated chip (IC) or an IC package. For example, at least some (for example, a CP corresponding to the cellular module 1021 and a WiFi processor corresponding to the WiFi module 1023) of processors respectively corresponding to the cellular module 1021, the WiFi module 1023, the BT module 1025, the GPS module 1027, and the NFC module 1028 can be implemented with one SoC.

The RF module 1029 is responsible for data transmission and reception, for example, the transmission/reception of an RF signal. Although not shown in the drawings, the RF module 1029 includes a transceiver, a power amp module (PAM), a frequency filter, or a low noise amplifier (LNA). Additionally, the RF module 1029 further includes components for transmitting/receiving electromagnetic waves on a free space in a wireless communication, for example, conductors or conducting wires. Although the cellular module 1021, the WiFi module 1023, the BT module 1025, the GPS module 1027, and the NFC module 1028 share one RF module 1029 shown in FIG. 10, according to an embodiment of the present disclosure, at least one of the cellular module 1021, the WiFi module 1023, the BT module 1025, the GPS module 1027, and the NFC module 1028 can perform the transmission/reception of an RF signal through an additional RF module.

The SIM card 1024 can be a card including a subscriber identification module and can be inserted into a slot formed at a specific position of an electronic device. The SIM card 1024 can include unique identification information (for example, an integrated circuit card identifier (ICCID)) or subscriber information (for example, an international mobile subscriber identity (IMSI)).

The memory 1030 (for example, the memory 140 or 240) can include an internal memory 1032 or an external memory 1034. The internal memory 1032 can include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 1032 is a Solid State Drive (SSD). The external memory 1034 further includes flash drive, for example, compact flash (CF), secure digital (SD), micro Micro-SD, Mini-SD, extreme digital (xD), or a memory stick. The external memory 1034 can be functionally connected to the electronic device 1000 through various interfaces. According to an embodiment of the present disclosure, the electronic device 1000 further includes a storage device (or a storage medium) such as a hard drive.

The sensor module 1040 measures physical quantities or detects an operating state of the electronic device 1000, thereby converting the measured or detected information into electrical signals. The sensor module 1040 includes at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (for example, a red, green, blue (RGB) sensor), a biometric sensor 1040I, a temperature/humidity sensor 1040J, an illumination sensor 1040K, or an ultra violet (UV) sensor 1040M. Additionally or alternatively, the sensor module 1040 includes an E-nose sensor (not shown), an electromyography (EMG) sensor, an electroencephalogram (EEG) sensor (not shown), an electrocardiogram (ECG) sensor (not shown), an infra-red (IR) sensor (not shown), an iris sensor (not shown), or a fingerprint sensor (not shown). The sensor module 1040 further includes a control circuit for controlling at least one sensor therein.

The input device 1050 (for example, the input module 110 or 210) includes a touch panel 1052, a (digital) pen sensor 1054, a key 1056, or an ultrasonic input device 1058. The touch panel 1052 recognizes a touch input through at least one of capacitive, resistive, infrared, or ultrasonic methods, for example. Additionally, the touch panel 1052 further includes a control circuit. In the case of the capacitive method, both direct touch and proximity recognition are possible. The touch panel 1052 further includes a tactile layer. In this case, the touch panel 1052 provides a tactile response to a user.

The (digital) pen sensor 1054 can be implemented through a method similar or identical to that of receiving a user's touch input or an additional sheet for recognition. The key 1056 can include a physical button, an optical key, or a keypad, for example. The ultrasonic input device 1058, as a device checking data by detecting sound waves through a microphone (for example, a microphone 1088) in the electronic device 1000, can provide wireless recognition through an input tool generating ultrasonic signals. According to an embodiment of the present disclosure, the electronic device 1000 can receive a user input from an external device (for example, a computer or a server) connected thereto through the communication module 1020.

The display 1060 (for example, the display 130 or 230) includes a panel 1062, a hologram device 1064, or a projector 1066. The panel 1062 includes a liquid-crystal display (LCD) or an active-matrix organic light-emitting diode (AM-OLED). The panel 1062 can be implemented to be flexible, transparent, or wearable, for example. The panel 1062 and the touch panel 1052 can be configured with one module. The hologram 1064 can show three-dimensional images in the air by using the interference of light. The projector 1066 can display an image by projecting light on a screen. The screen, for example, can be placed inside or outside the electronic device 1000. According to an embodiment of the present disclosure, the display 1060 further includes a control circuit for controlling the panel 1062, the hologram device 1064, or the projector 1066.

The interface 1070 includes a high-definition multimedia interface (HDMI) 1072, a universal serial bus (USB) 1074, an optical interface 1076, or a D-subminiature (sub) 1078, for example. Additionally or alternatively, the interface 1070 includes a mobile high-definition link (MHL) interface, a secure Digital (SD) card/multi-media card (MMC) interface, or an infrared data association (IrDA) standard interface.

The audio module 1080 converts sound into electrical signals and convert electrical signals into sounds. The audio module 1080 can process sound information inputted, or outputted, or both, through a speaker 1082, a receiver 1084, an earphone 1086, or a microphone 1088.

The camera module 1091, as a device for capturing a still image and a video, can include at least one image sensor (for example, a front sensor or a rear sensor), a lens (not shown), an image signal processor (ISP) (not shown), or a flash (not shown) (for example, an LED or a xenon lamp).

The power management module 1095 manages the power of the electronic device 1000. Although not shown in the drawings, the power management module 1095 can include a power management IC (PMIC), a charger IC, or a battery or fuel gauge, for example.

The PMIC can be built in an IC or SoC semiconductor, for example. A charging method can be classified into a wired method and a wireless method. The charger IC can charge a battery and can prevent overvoltage or overcurrent flow from a charger. According to an embodiment of the present disclosure, the charger IC can include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, can be added.

The battery gauge measures the remaining amount of the battery 1096, or a voltage, current, or temperature of the battery 1096 during charging. The battery 1096 stores or generates electricity and supplies power to the electronic device 1000 by using the stored or generated electricity. The battery 1096, for example, can include a rechargeable battery or a solar battery.

The indicator 1097 displays a specific state of the electronic device 1000 or part thereof (for example, the AP 1010), for example, a booting state, a message state, or a charging state. The motor 1098 converts electrical signals into mechanical vibration. Although not shown in the drawings, the electronic device 1000 includes a processing device (for example, a GPU) for mobile TV support. A processing device for mobile TV support can process media data according to the standards such as digital multimedia broadcasting (DMB), digital video broadcasting (DVB), or media flow.

Each of the above-mentioned components of the electronic device according to various embodiments of the present disclosure can be configured with at least one component and the name of a corresponding component can vary according to the kind of an electronic device. An electronic device according to various embodiments of the present disclosure can include at least one of the above-mentioned components, cannot include some of the above-mentioned components, or can further include another component. Additionally, some of components in an electronic device according to various embodiments of the present disclosure are configured as one entity, so that functions of previous corresponding components are performed identically.

Although specific events have been described in relation to the type of the pen attribute changing window, the events may be changed when corresponding functions are designed. Furthermore, a width, a color, and the like have been mentioned in relation to the pen attribute, but various embodiments of the present disclosure are not limited thereto. For example, the pen attribute may include a pen style (e.g., a brush, a ballpoint pen, a pencil, a marker, or the like).

Each of the above-mentioned elements of the electronic device according to various embodiments of the present disclosure may be configured with one or more components, and the names of the elements may be changed corresponding to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" or "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-programmable gate array (FPGA), or a programmable-logic device for performing some operations, which are known or will be developed.

According to various embodiments of the present disclosure, at least a part of devices (e.g., modules or functions thereof) or methods (e.g., operations) according to various embodiments of the present disclosure may be implemented as instructions stored in a computer-readable storage medium in the form of a programming module. In the case where the instructions are performed by at least one processor (e.g., the processor 120), the at least one processor may perform functions corresponding to the instructions. The computer-readable storage medium may be, for example, the memory 130. At least a part of the programming module may be implemented (e.g., executed) by the processor 120. At least a part of the programming module may include, for example, a module, a program, a routine, sets of instructions, or a process for performing at least one function.

According to various embodiments of the present disclosure, a computer-readable storage medium stores at least one instruction executable on the basis of at least one processor, wherein the instruction may be configured to perform outputting a user interface corresponding to an input area for adjusting an execution attribute of an electronic pen (e.g., at least one of a width, a color, or a form (or a style) of a line input by the electronic pen) in response to occurrence of a specified event, receiving the specified event on the basis of the input area, and adjusting the execution attribute of the electronic pen corresponding to the specified event.

The computer-readable recording medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and a hardware device configured to store and execute program instructions (e.g., a programming module), such as a read only memory (ROM), a random access memory (RAM), a flash memory, or the like. The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

According to the electronic pen operating method and the electronic device according to various embodiments of the present disclosure, change of an attribute of an electronic pen and support of a function performed on the basis of the electronic pen may be performed intuitively and easily.

The above embodiments of the present disclosure are illustrative and not limitative. Various alternatives and equivalents are possible. Other additions, subtractions, or modifications are obvious in view of the present disclosure and are intended to fall within the scope of the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display; and
a processor configured to:
control the display to display an input screen for receiving an input by an electronic pen;
receive on the input screen, a hovering input of the electronic pen;
in response to receiving the hovering input, control the display to display a control window for configuring an attribute of the electronic pen while the input screen is being displayed;
receive a touch input on the control window; and
in response to receiving the touch input, change the attribute of the electronic pen.

2. The electronic device of claim 1, wherein the processor is further configured to adjust at least one of a size, a shape or a location of the control window.

3. The electronic device of claim 1, wherein the processor is further configured to:
control the display to display a window for selecting one of a pen function and an eraser function, in response to detecting the touch input on the control window,
magnify the input screen or perform redoing of a previous input corresponding to the touch input on the control window, or
reduce the input screen or perform undoing of the previous input corresponding to the touch input on the control window.

4. The electronic device of claim 1, wherein the display comprises a touch panel for detecting the hovering input of the electronic pen or a hovering maintaining input for more than a specified time.

5. The electronic device of claim 4, wherein:
the processor is further configured to control the display to display another control window at a location where the hovering input of the electronic pen is detected, and
the another control window comprises a plurality of items indicating the attribute of the electronic pen.

6. The electronic device of claim 5, wherein the another control window comprises at least one of a pen attribute changing window related to adjustment of a width of the electronic pen, a pen attribute changing window related to adjustment of a color of the electronic pen, or a pen attribute changing window related to adjustment of a style of the electronic pen.

7. The electronic device of claim 5, wherein the processor is further configured to remove at least one of the another control window or the control window from the display in response to detecting that a specific item is selected from the another control window or in response to detecting that the hovering input of the electronic pen is released.

8. The electronic device of claim 1, wherein the processor is further configured to move an object on the input screen based on movement of the control window.

9. The electronic device of claim 1, wherein the processor is configured to:
perform at least one of control of outputting the control window to a specified portion of the display, control of changing an output position of the control window corresponding to a grip direction of the electronic pen;
output the control window in an area of the display where information is not displayed;
output the control window in an area having a size larger than a specified size of the control window, among areas of the display where information is not displayed;
output the control window to an area located at an opposite side to the grip direction, among the areas of the display where information is not displayed;
output the control window to a largest area among the areas of the display where information is not displayed; or
output the control window to a specified information display area in response to determining that none of the areas of the display where information is not displayed has a size larger than a specified minimum size of the control window.

10. A method for operating an electronic pen, the method comprising:
displaying, by a display of an electronic device, an input screen for receiving input by the electronic pen;
receiving, on the input screen, a hovering input of the electronic pen;
in response to receiving the hovering input, displaying, by the display, a control window for configuring an attribute of the electronic pen while the input screen is being displayed;
receiving a touch input on the control window; and
processing a function related to operation of the electronic pen corresponding to the touch input.

11. The method of claim 10, further comprising adjusting at least one of a size, a form, or a location of the control window.

12. The method of claim 10, wherein the processing of the function comprises at least one of:
displaying a window for selecting one of a pen function and an eraser function, in response to detecting the touch input on the control window;
magnifying the input screen or performing redoing of a previous input corresponding to the touch input on the control window; and
reducing the input screen or performing undoing of the previous input corresponding to the touch input on the control window.

13. The method of claim 10, wherein receiving the hovering input comprises at least one of:
receiving the hovering input related to the electronic pen; and
receiving an input of maintaining a hovering state of the electronic pen for a predetermined time.

14. The method of claim 13, further comprising:
displaying another control window at a location where the hovering input of the electronic pen is detected,
wherein the another control window comprises a plurality of items indicating the attribute of the electronic pen.

15. The method of claim 14, wherein the another control window comprises at least one of:
a pen attribute changing window related to adjustment of a width of the electronic pen corresponding to a touch input on the control window;
a pen attribute changing window related to adjustment of a color of the electronic pen corresponding to the touch input on the control window; and
a pen attribute changing window related to adjustment of a style of the electronic pen corresponding to the touch input on the control window.

16. The method of claim 14, further comprising removing at least one of the another control window or the control window from the display in response to detecting that a specific item is selected from the another control window or the hovering input of the electronic pen is released.

17. The method of claim 10, further comprising:
moving an object on the input screen of the display corresponding to movement of the control window.

18. The method of claim 10, further comprising at least one of:
outputting the control window at a specified portion of the display;
changing an output position of the control window corresponding to a grip direction of the electronic pen;
outputting the control window to an area of the display where information is not displayed;
outputting the control window in an area having a size larger than a specified size of the control window, among areas of the display where information is not displayed;
outputting the control window to an area located at an opposite side to the grip direction, among the areas of the display where information is not displayed;
outputting the control window to a largest area among the areas of the display where information is not displayed; and
outputting the control window to a specified information display area in response to determining that none of the areas of the display where information is not displayed has a size larger than a specified minimum size of the control window.

* * * * *